No. 708,108. Patented Sept. 2, 1902.
G. WIESECKEL.
VERTICAL LIFT LUBRICATING VALVE FOR STEAM CHESTS.
(Application filed Apr. 5, 1901.)
(No Model.)
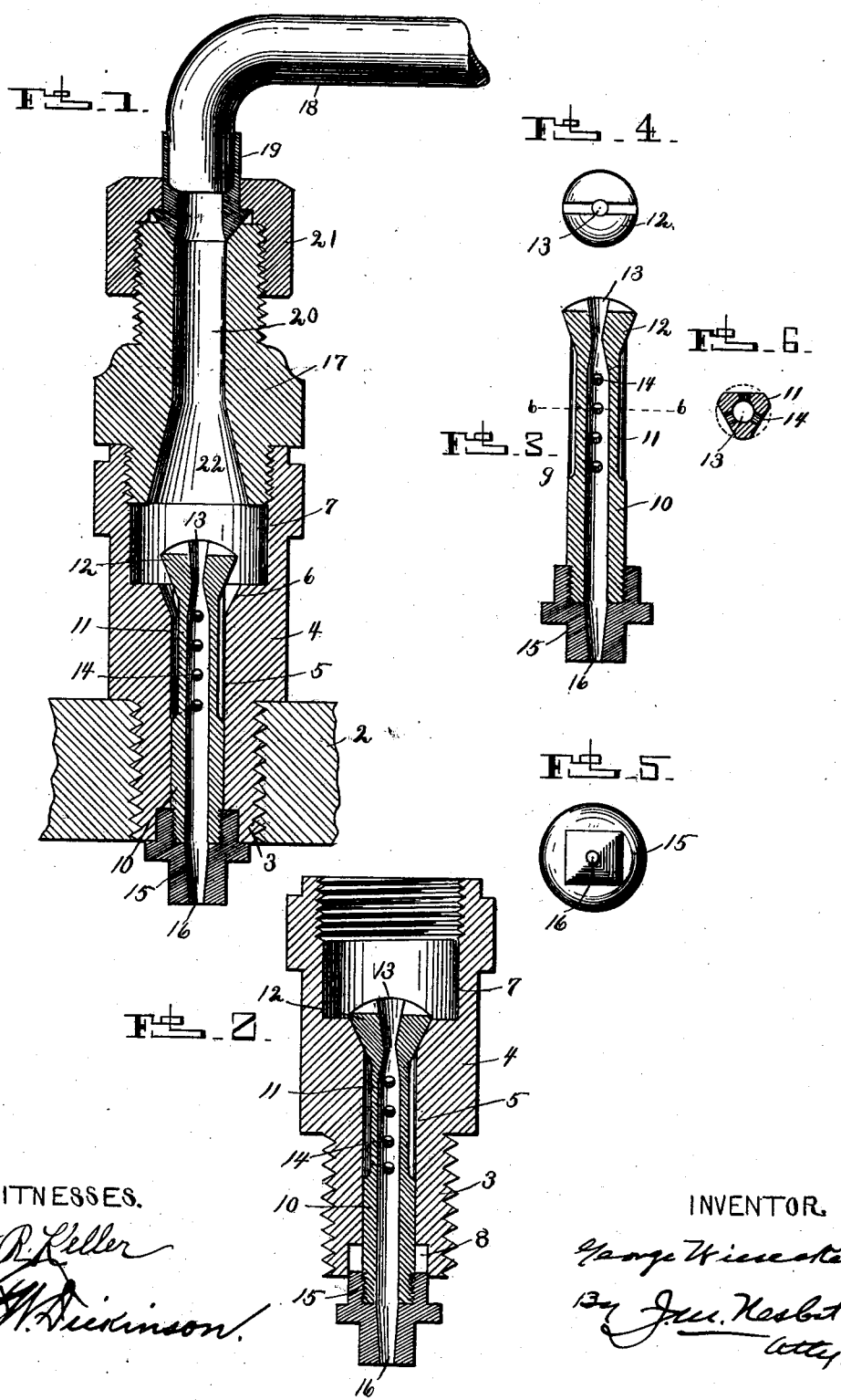
WITNESSES.
INVENTOR.

UNITED STATES PATENT OFFICE.

GEORGE WIESECKEL, OF ALLEGHENY, PENNSYLVANIA.

VERTICAL-LIFT LUBRICATING-VALVE FOR STEAM-CHESTS.

SPECIFICATION forming part of Letters Patent No. 708,108, dated September 2, 1902.

Application filed April 5, 1901. Serial No. 54,507. (No model.)

*To all whom it may concern:*

Be it known that I, GEORGE WIESECKEL, a citizen of the United States, residing at Allegheny, in the county of Allegheny and State of Pennsylvania, have invented certain new and useful Improvements in Vertical-Lift Lubricating-Valves for Steam-Chests, of which the following is a specification, reference being had therein to the accompanying drawings.

This invention relates to lubricators for locomotive slide-valves and cylinders, and has particular reference to means for maintaining a constant and substantially uniform feed of oil regardless of the presence or absence of steam in the steam-chest.

The invention finds embodiment in a differential piston-valve containing a constantly-open choked passage and controlling a by-pass or auxiliary passage, the larger area of the valve being at its steam-chest end and the smaller area at the lubricator end, whereby without steam in the chest the valve is seated and feeds only through the choked passage, but when steam is admitted to the chest it acts on the larger valve area to raise and unseat it against the lubricator-pressure and open the by-pass or auxiliary passage. I am not the first to propose the use of a differential valve operating in the general manner above stated, an example of such valve being shown in the patent to Hugh Woods, No. 645,026, March 6, 1900.

My invention has reference to certain structural features and arrangements whereby the efficiency of the valve mechanism is greatly increased under all working conditions.

In the accompanying drawings, Figure 1 is a longitudinal sectional view of a valve and valve-casing embodying my invention, showing the valve raised from its seat, as when steam is admitted to the steam-chest. Fig. 2 is a similar view of the valve, showing the same seated, as when the chest is without steam. Figs. 3, 4, 5, and 6 are detailed views of the valve, Fig. 6 being a cross-section taken on line 6 6 of Fig. 3.

Referring to the drawings, 2 represents a portion of a steam-chest lid apertured to receive the threaded extremity 3 of valve-casing 4. The casing is formed with a longitudinal passage 5, reamed at its upper end to form the tapered or conical valve-seat 6, which communicates with enlarged cavity 7 in the upper portion of the casing and at its lower end countersunk at 8.

9 is a piston-valve of differential type fitted in passage 5, as indicated at 10, and slightly longer than the passage, to move longitudinally therein. The larger area of the valve is at its lower or steam-chest end 15, while its smaller area is at its upper or lubricator end, which latter is formed into the tapered or conical head 12, which closely fits seat 6. Above portion 10 of the valve, which closely fits passage 5, and below head 12 the valve is preferably of triangular section, as indicated at 11, to afford access to a series of lateral apertures 14, formed in the valve. The upper end of the valve-bore is contracted at 13 to form a choked passage, while the lower end of the valve-bore is contracted, but preferably in a lesser degree, as indicated at 16. The valve-casing 4 is united with tallow pipe 18, extending in usual manner from the lubricator in the cab, by means of interposed coupling 17, having its bore 20 enlarged or flared at its lower end, where it unites with casing 4, as indicated at 22, for the purpose of diffusing the steam and oil passing therethrough to all portions of casing-cavity 7. Pipe 18 may be provided with a brazed enlargement 19, whereby it is confined on coupling 17 by nut 21.

In operation the sight-feed lubricator in the locomotive-cab is set to feed the desired number of drops of oil per minute, and it is the function of my improved valve to effect a constant and substantially uniform feed of the same to the steam-chest, without regard to the presence or absence of steam in the latter. When the chest is without steam, as when the throttle is closed, the lubricator-pressure acts on the upper end or smaller area of the valve, holding it tightly to its seat 6, as indicated in Fig. 2. In this position the choked passage 13 is the only outlet for the steam and oil, and said passage is of such size as to effectively feed the oil, the amount thereof being predetermined by the adjustment of the cab-lubricator, as above indicated. In this position, with the engine running without steam, as on a downgrade, it is very essential that passage of steam and oil be confined absolutely to the choked opening, for if it has any other escape the effectiveness of the device is very materially impaired, if not altogether destroyed. This will be appreciated when it is borne in mind that the area of the choked passage is based on a very precise computation of the condition under which the feed is maintained, so that any deviation therefrom is of very material importance. Hence it is very essential that a sealed seat be provided for the valve, through which it is absolutely impossible for any steam and oil to pass as long as the valve remains seated. In my embodiment of the invention the tapered valve-head 12, in conjunction with the tapered seat 6, forms the essentially perfect seal, the efficiency of which is maintained by the lubricator-pressure on the upper end of the valve, as will be understood. When the valve is seated, the chest being without steam, the requisite feed of the lubricant is maintained by and through upper choked passage 13 of the valve, while the lower choked passage 16 (preferably slightly larger than passage 13) accurately determines the feed when the valve is raised by the admission of steam to the chest, the oil and steam then entering the valve through side apertures 14 as well as upper choked passage 13.

I claim—

1. In valve mechanism for lubricators, the combination of a casing adapted at opposite ends to connect with a steam-chest and a lubricator, a hollow piston-valve movable longitudinally in the casing and provided with permanently-open contracted inlet and outlet orifices and with additional inlet-orifices, separate and distinct from the permanently-open inlet-orifice, said additional orifices being open only when the valve is operated by steam-chest pressure.

2. In valve mechanism for lubricators, the combination of a casing adapted at opposite ends to connect with a steam-chest and a lubricator, a hollow piston-valve movable longitudinally in the casing and provided with permanently-open contracted inlet and outlet orifices, the inlet-orifice being of smaller area than the outlet-orifice, the valve having additional inlet-orifices, separate from the permanently-open contracted inlet-orifice, opened only when the valve is operated by steam-chest pressure.

3. In valve mechanism for lubricators, the combination of a casing adapted at opposite ends to connect with a steam-chest and a lubricator, a hollow piston-valve movable longitudinally in the casing and provided at opposite ends with permanently-open contracted inlet and outlet orifices and with side inlet-orifices separate and distinct from the permanently-open contracted inlet-orifice, the valve-casing being formed with a seat and the lubricator end of the valve with a head complementary with the seat, whereby when the valve is seated the said side inlet-orifices are closed to the ingress of steam and oil.

4. In valve mechanism for lubricators, the combination of a casing adapted at opposite ends to connect with a steam-chest and with a lubricator, a piston-valve operative therein formed with a longitudinal passage-way having its outlet or steam-chest end and its inlet or lubricator end contracted, the intermediate portion of the passage-way being relatively large and provided with lateral inlet-orifices which are open only when the valve is operated by steam-chest pressure.

In testimony whereof I affix my signature in presence of two witnesses.

GEORGE WIESECKEL.

Witnesses:
J. M. NESBIT,
ALEX. S. MABON.